United States Patent [19]

Muraguchi et al.

[11] Patent Number: 4,586,864
[45] Date of Patent: May 6, 1986

[54] SUPPORT DEVICE FOR CHECKING AND REPAIRING A HEAVY ROTATABLE OBJECT

[75] Inventors: Yutaka Muraguchi, Nogata; Katsusuke Yoshida; Shoichi Shiraishi, both of Fukuoka, all of Japan

[73] Assignee: Hoko Sangyo Co., Ltd., Fukuoka, Japan

[21] Appl. No.: 718,174

[22] Filed: Apr. 1, 1985

Related U.S. Application Data

[63] Continuation of Ser. No. 494,780, May 16, 1983, abandoned.

[30] Foreign Application Priority Data

May 21, 1982 [JP] Japan .................................. 57-75641

[51] Int. Cl.$^4$ .............................................. B65G 70/00
[52] U.S. Cl. ............................ 414/433; 269/289 MR; 269/71; 269/60
[58] Field of Search .................... 269/60, 71, 289 MR; 414/433

[56] References Cited

U.S. PATENT DOCUMENTS

| 1,033,921 | 7/1912 | Morton | 269/60 |
| 2,134,234 | 10/1938 | Orcutt et al. | 51/216 ND |
| 3,057,240 | 10/1962 | DeWitt | 269/60 |
| 4,452,558 | 6/1984 | Muraguchi | 269/289 MR |

Primary Examiner—Frederick R. Schmidt
Assistant Examiner—Judy J. Hartman
Attorney, Agent, or Firm—Jordan and Hamburg

[57] ABSTRACT

A support device for checking and repairing a heavy rotatable object such as a large turbine rotor comprises a pair of self-aligning support structures for rotatably supporting both ends of the shaft of the heavy rotatable object. In each self-aligning support structure, a roller support base rotatably supporting the corresponding end of the shaft of the object with a pair of support rollers is mounted on a base frame by means of a hemispherical support mechanism, and moreover a jig for adjusting the horizontal rotating position of the roller support base around the vertical axis of the hemispherical support mechanism is disposed in the periphery of the base frame, so that the occurrence of the thrust force on the heavy rotatable object as well as the support rollers is completely eliminated.

11 Claims, 15 Drawing Figures

SUPPORT DEVICE FOR CHECKING AND REPAIRING A HEAVY ROTATABLE OBJECT

This application is a continuation of application Ser. No. 494,780, filed 5/16/83 now abandoned.

BACKGROUND OF INVENTION

The present invention relates to a support device which supports the both ends of the shaft of a heavy rotatable object, particularly of a large-sized and heavy-weight turbine rotor for a power generator for checking and repairing them and easily achieves adjustment of horizontal levelling.

Conventionally when a turbine rotor for power generator, for example, is checked and repaired, two ends of a shaft of the turbine rotor are removed from the generator and are situated on a roller support base mounted on a base frame of a support device by means of a plurality of adjusting bolts. Moreover, such base frame has been generally installed on the floor surface not specially strengthened. Therefore, even if an accurate horizontal levelling of the roller support base is obtained previously by means of the adjusting bolts, when the turbine rotor is once placed on the roller support base, the floor surface is distorted or warped by the weight of said roller support base resulting in poor levelling. Such poor levelling or distortion of floor surface produces a considerable degree of thrust on the supporting rollers of roller support base. This thrust is enhanced by deflection of rotor shaft. Thereby, the turbine is encountered with irregular rotation including movement in the axial direction. Accordingly, not only check and repair of turbine become extremely difficult and cumbersome, but also, in extreme cases, such irregular rotation results in partial abrasion of supporting rollers or rupture of them in some cases. This makes check and repair very dangerous. Consequently, further level adjustment is essential for preventing such situation, but it has always required much difficulty followed by a great expenditure of time and labor.

The inventors of the present invention have proposed, in the Japanese patent application No. 168450/1981, a support device for checking and repairing a heavy rotatable object such as a turbine rotor providing an automatic level adjusting mechanism which simplifies the level adjustment by eliminating defects of existing support devices. Namely, such device can automatically align the axis of the heavy rotatable object with the axis of support rollers. However, such a support device for checking and repairing the heavy rotatable shaft which has the construction shown in FIG. 1, has not yet been considered perfect in such a point that it results in the movement of a turbine rotor (b) in the axial direction, although a little, when the turbine rotor is rotated for checking after the turbine rotor is placed on the roller support base (a). Such movement in the axial direction is supposed to occur due to the following causes.

Since the roller support base (a) is supported by the hemi spherical support (c), the axis of the turbine rotor (b) and the roller (d) supporting the end of the turbine rotor (b) would have ideally been parallel to each other when the turbine rotor (b) is placed on the roller support base (a). Moreover, even when the turbine rotor (b) is rotated by means of the roller (d), so long as the parallelism between the axes of the rotor (b) and the roller (d) are surely kept, any thrust load would not have been generated to thereby prevent any movement of the rotor in the axial direction. However, practically, both axes of the rotor (b) and the roller (d) become non-parallel because of some reasons, for example, indicated below.

(a) Machining error
(b) Assembling error
(c) Unbalance of roller support base (a) before placing the turbine rotor (b)
(d) Unbalance of roller support base (a) after placing of the turbine rotor (b) or resultant deformation
(e) Effect of driving force
(f) Effect of friction The causes (a) to (d) are considered to bring about following phenomena.

(1) Destroying parallelism (alignment) between the axes of the turbine rotor (b) and roller (d).
(2) Destroying a uniform contact pressure between the rotor (b) and roller (d) to thereby change inclination between the turbine rotor (b) and roller shaft (d) when a drive force is applied.

Here, one condition (before start of operation is supposed) where the rotor (b) is only placed on the roller support base (a) (Refer to FIG. 1.). Although the horizontal levelling is a little poor as explained previously because of above-listed causes, the system as a whole is balanced as shown in FIG. 2. However, this condition does not guarantee that a pressure between the turbine rotor (b) and roller (d) is uniformly distributed in along the axial direction. Rather, the pressure is considered to be inwardly (blade side) or outwardly deniated. To be more in detail, if the inner pressure of one roller (d) of the roller support base (a) in the driving side is, for example, high, a resultant pressure at the inside of the other roller (d) also becomes high. Accordingly, the moments at the center of the hemi spherical support mechanism (c) must be mutually cancelled.

When a driving force is applied under this condition, a larger tangent force is transmitted in the high pressure side and thereby a reacting force resulting from the turbine rotor (b) generates unbalanced moments at the center of hemi spherical support mechanism. As a result, the roller support base (a) generates rotating deflection in the direction of such moment as shown in FIG. 3. If a gradient is thus generated between the axis of the turbine rotor (b) and the axis of the roller (d), the pressure and the tangent force are redistributed, to thereby balance the moments at the center of the hemi spherical support mechanism (c). When the turbine rotor is rotating in the condition as shown in FIG. 3, the turbine rotor (b) moves in the axial direction. If it is rotated reversely, a tangent force is generated reversely, resulting in a rotating deflection directed to the roller support base (a). Therefore, the turbine rotor (b) also moves in the same direction as explained above.

If the movement is considered to occur in the axial direction because of the reason described above, the roller support base (a) must rotate only a little in such a moment when the turbine rotor (b) is driven.

From the above observation and analysis, following measures are considered effective for making such movement in the axial direction as small as possible.

(1) The roller support base (a) is fixed under the condition that the rotor (b) is placed on the support base (a) so that the base (a) is no longer rotated even with a driving force on a horizontal plane.
(2) In this case, if the roller support base (a) is fixed by screwing, the movement can further be kept small through the adjustment by slightly rotating the roller support base (a) in accordance with direction and amount of movement of the base (a) when checked trially by rotating the turbine rotor (d).

The present invention has been derived from such findings and experiences and intended to provide a support device for checking and repairing a heavy rotatable object which further simplifies the levelling or the alignment and ensures, a more accurate and safer check and repair by eliminating the movement in the axial direction of turbine rotor which has been generated by driving the turbine rotor in the existing system.

In summary, the present invention relates to a support device for checking and repairing a heavy rotatable object, wherein such device comprises a pair of self-aligning support structures for rotatably supporting both ends of the heavy rotatable object. In each support structrue, a roller support base supporting rotatably the end of the shaft of the heavy rotatable object is supported on an adjustable surface plate of the base frame by means of a hemi spherical support mechanism, and moreover a jig for adjusting the horizontal rotating position of the roller support base around the vertical axis of a hemi spherical support mechanism is mounted in the periphery of an adjustable surface plate.

DETAILED DESCRIPTION OF DISCLOSURE

Figure 1:
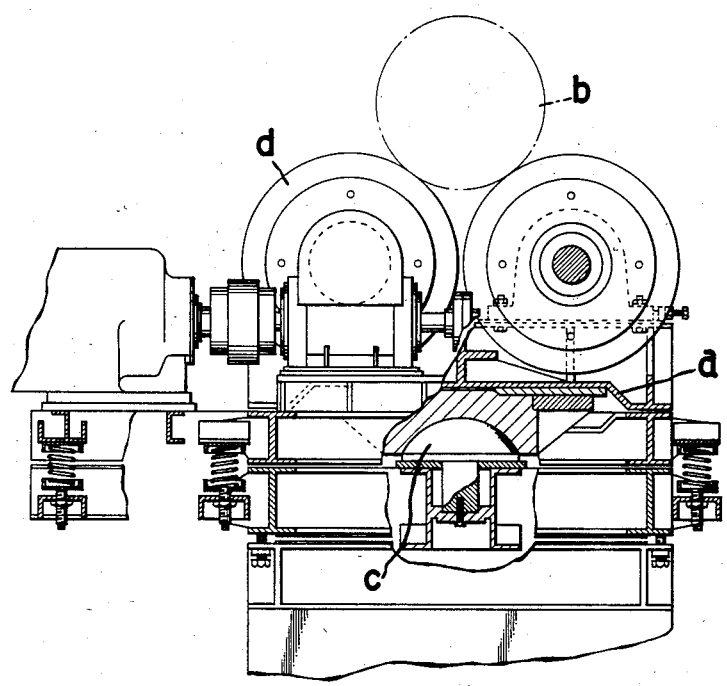
FIG. 1 shows an enlarged side elevational view including a partial cutaway portion of the conventional support device for checking and repairing the heavy rotatable shaft.
Figure 2:
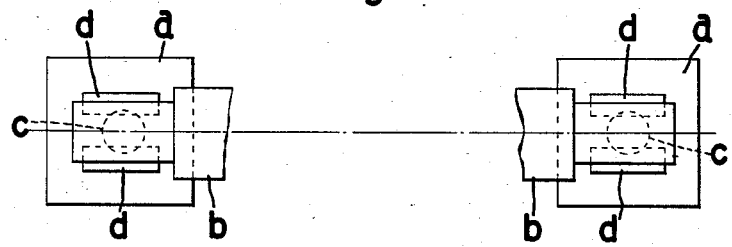
FIG. 2 and FIG. 3 are explanatory views showing the horizontal levelling operation by the same support device.
Figure 3:
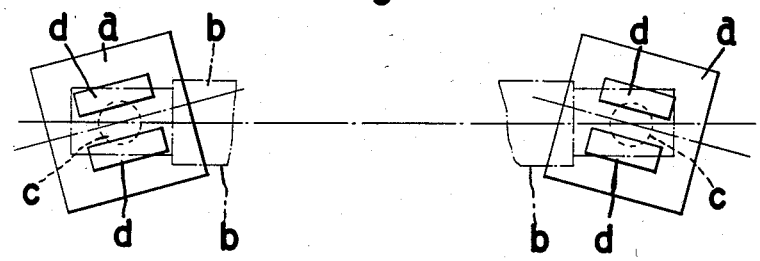

A preferred embodiment of the support device of the present invention is hereinafter disclosed in detail in conjunction with the attached drawings. (Refer to FIG. 4 to FIG. 11.)

In the drawings, numeral (1) is a drive-side roller support base, while numeral (1') is a follower-side roller support base. These roller support bases (1) and (1') are supported respectively at their centers on the adjustable surface plates (4) and (4') of the base frames (3),(3') by means of the hemi spherical support mechanisms (2) and (2').

The drive-side roller support base (1) is provided with a pair of drive rollers (5), (5). The rotating shafts (6), (6) of these rollers (5), (5) are respectively supported at the right and left sides by the bearings (7) and (7). Moreover, the worms (11), (11) provided on the power transmission shaft (10) of the geared motor (9) are engaged with the worm wheels (8), (8) provided at the both ends of said rotating shaft. Thereby, the drive rollers (5), (5) rotate synchronously, causing the one end (12) of the shaft of the turbine rotor supported by such rollers (5), (5) to rotate at a speed as low as 0.3 rpm.

Meanwhile, the follower-side roller support base (1') has such a simple structure that the shafts (6'), (6') of a pair of follower-side rollers (5'), (5') are supported by the bearings (7'), (7') as in the case above and the other end (12) of the shaft of the turbine rotor is rotatably supported by these roller (5'), (5'). The above drive-side rollers and follower-side rollers are generally made of specially reinforced plastic materials. Furthermore, a means for weight balance is added adequately to the drive-side roller support base (1).

Said hemi spherical support mechanisms (2), (2') are disposed at the center of respective roller support bases (1), (1'). Each mechanism comprises a vertical support shaft (21), (21') which has the top or upper end thereof formed approximately in a hemi spherical shape and hemi spherical-recessed pad (22), (22') which is uniformly engaged with the hemi sherical top of vertical support shaft (21), (21'). Although in the drawings, the support shafts (21), (21') are provided at the center of adjustable surface plate (4), (4') on the base frames (3), (3') and the hemi spherical-recessed pads (22), (22'), also at the center of roller support bases (1), (1'), they may also be mounted upside down respectively. In addition, a suitable lubricant is applied to the contact surfaces of hemi spherical support mechanism (2), (2'). It is also preferable to provide compression springs (13), (13') between the roller support bases (1), (1') and adjustable surface plates (4), (4') so as to make the roller support bases (1), (1') resiliently return and take a position parallel to the surface plates (4), (4').

A suitable gap or clearance must be provided between the adjustable surfaces plates (4),(4') and the upper roller support bases (1), (1') so as to allow the roller support bases (1), (1') to sufficiently tilt in all radial directions on the hemi spherical support mechanisms (2), (2'). Moreover, the surface plates (4), (4') are mounted on the base frames (3), (3') with plurality of adjusting bolts (14), (14') so that they can be vertically adjusted freely to the desired height. Numerals (15), (15') are guide pins. This adjusting means is a well known method.

Figure 4:
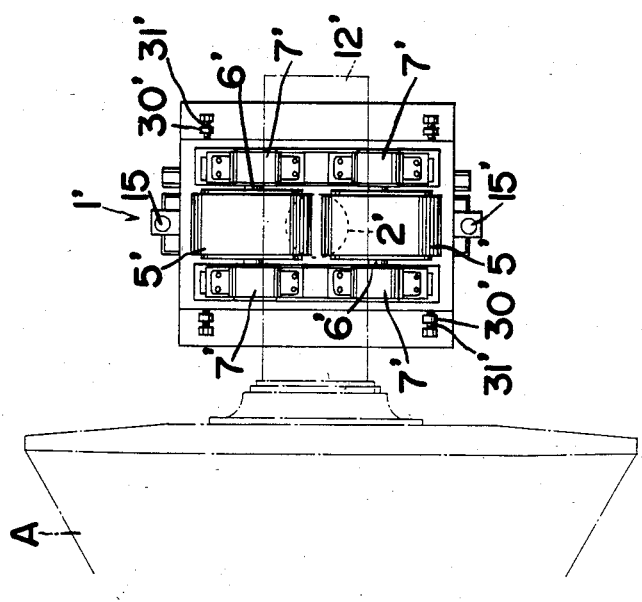
FIG. 4 is a plan view of the support device for checking and repairing the heavy rotatable object to which the present invention is applied.
Figure 4:
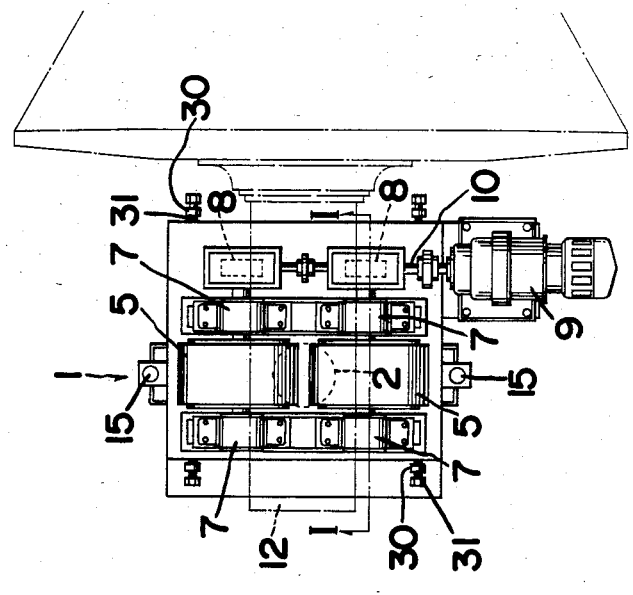
Figure 5:
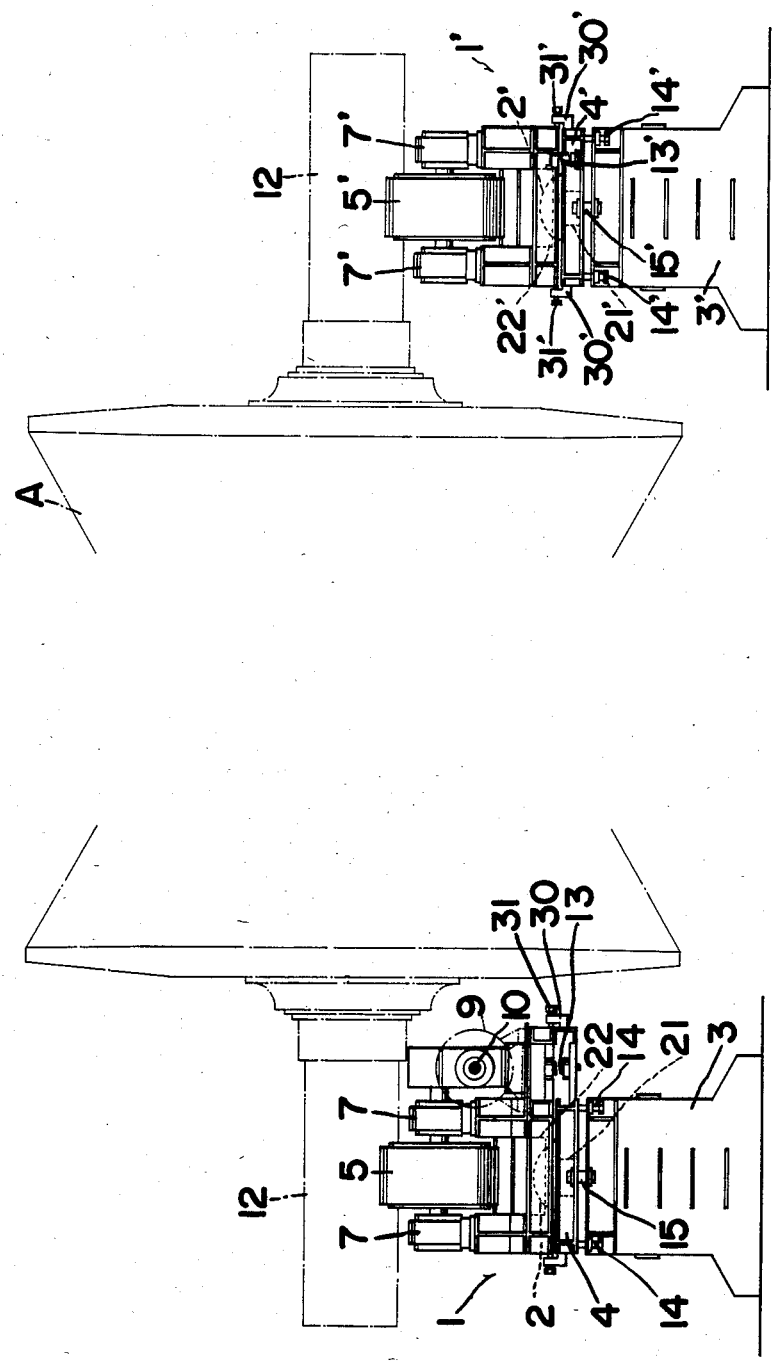
FIG. 5 is a front view of the same support device.
Figure 6:
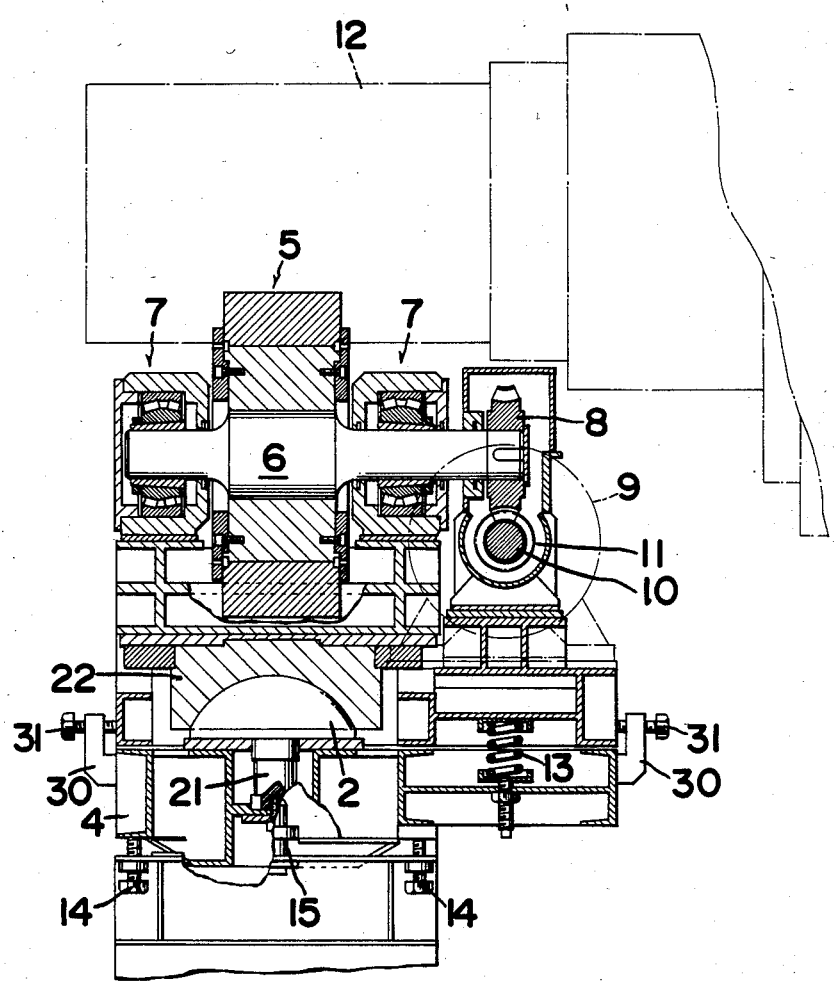
FIG. 6 is a cross-sectional view along the line I—I in FIG. 4.
Figure 7:
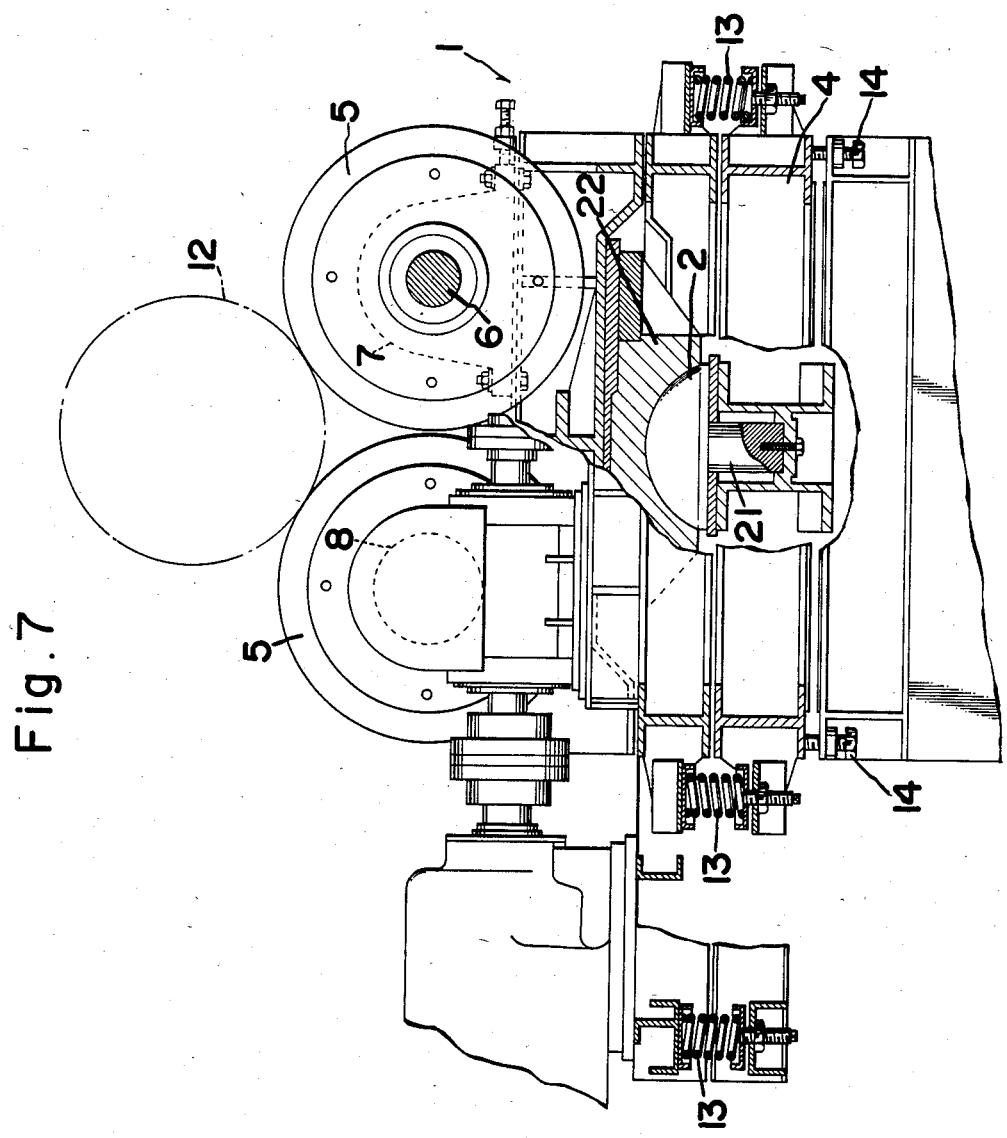
FIG. 7 is a side elevational view including a partial cut-away portion of the drive-side support structure.

The present invention is substantially characterized by incorporating a following structure to the above basic structure. Namely, a jig (29) for adjusting the horizontal rotating positions of the roller support bases (1), (1') around the hemi spherical support mechanisms (2), (2') is attached to the periphery of the adjustable surface plates (4), (4'). Such rotating position adjusting jig (29) can be installed, as shown in FIG. 4 and FIG. 5. L-shaped brackets (30), (30') are mounted in the front and rear sides of the adjustable surfaces plates (4), (4') symmetrically to the axis of the shaft of the turbine rotor (A) with a specified interval, the adjusting bolts (31), (31') are screwed to the upper ends of the same L-shaped brackets (30), (30'), and the end points of the bolts (31), (31') come into contact with the corresponding side edges of roller support bases (1), (1'). It is also enough to mount such rotating position adjusting jig only to the drive side.

Figure 8:
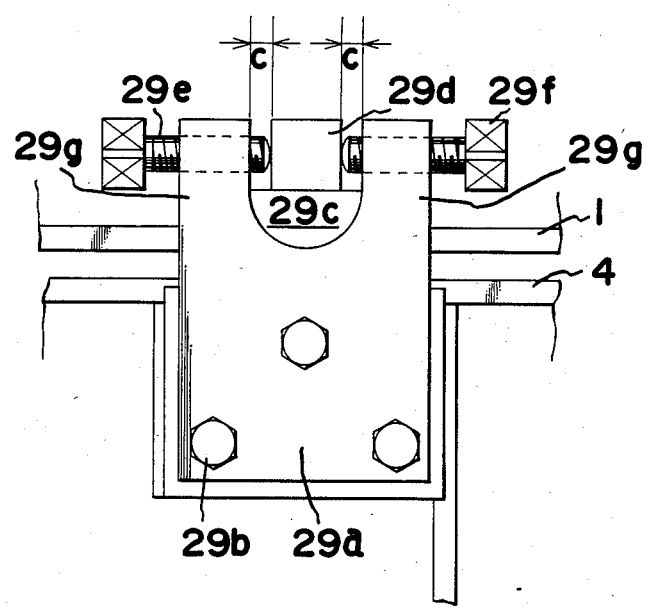
FIG. 8 is an enlarged front view of the mounting portion of the roting position adjusting jig.
Figure 9:
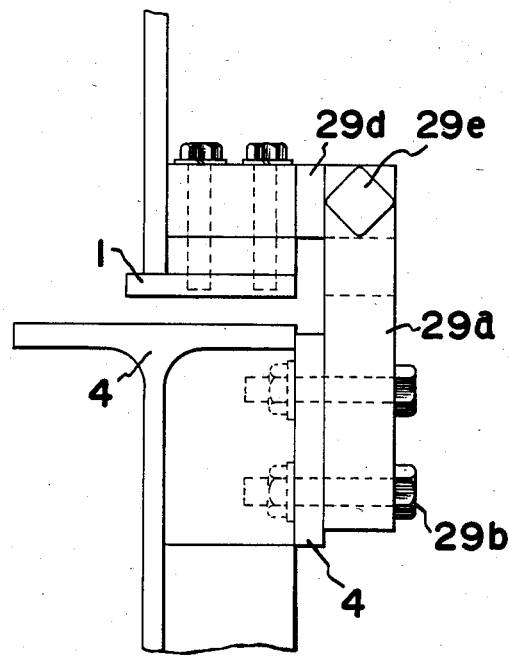
FIG. 9 is a plan view of the same support structure.

FIG. 8 and FIG. 9 show another embodiment of the rotating position adjusting jig (29a) is a fixed plate attached by a coupling bolt (29b) to the periphery of the adjustable surface plate (4). This fixed plate (29a) is provided with a hollow groove (29c) at its upper portion allowing insertion of a distal portion of a projection (29d) which has the proximal end thereof connected to the periphery of the roller support base (1), with gaps (c). In addition, numerals (29e), (29f) indicate adjusting bolts screwed to vertical portions (29g) located in both sides of such hollow groove (29c) and these bolts (29e), (29f) move forward or backward to/from the projection (29d) and also abut therewith. By adjusting amount of movement of the adjusting bolt (29e) with such structure, the relative horizontal rotating position of the rotor base (1) to the adjustable surface plate (4) can easily be adjusted, and such adjusted position can be maintained reliably.

Figure 10:
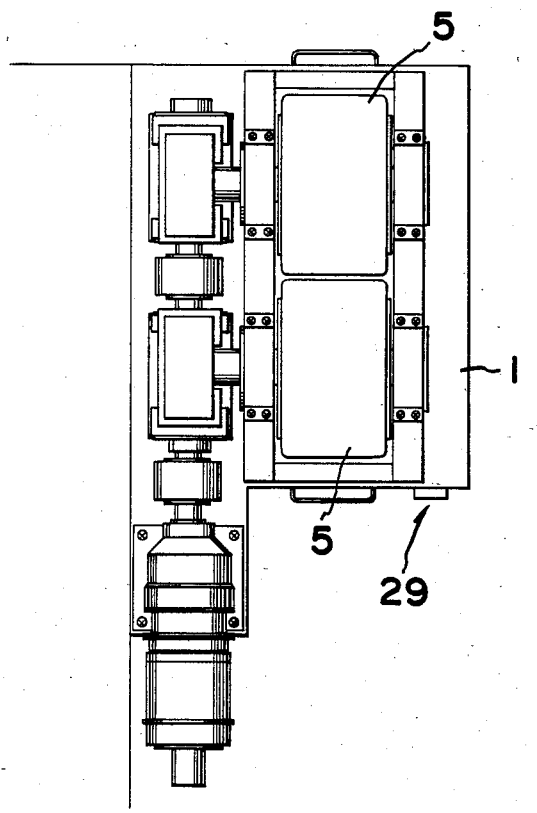
FIG. 10 and FIG. 11 are a plan view and a front view of the same support structure indicating the mounting position of the rotating position adjusting jig.
Figure 11:
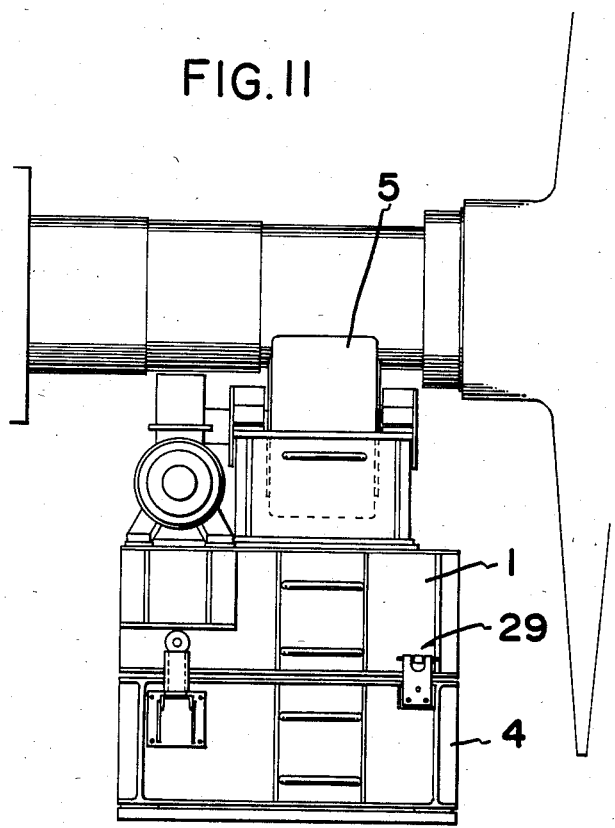

FIG. 10 and FIG. 11 show the mounting conditions of aforementioned rotating position adjusting jig (29). In this mounting example, it is enough to mount such jig (29) only at a position in the periphery of the adjustable surface plates (4), (4'). However, it is also possible to mount a plurality of such jigs (29) including the other positions.

With such structure, the manner in which the support structure of the present invention effect the horizontal levelling at the top of the hemi spherical support mechanisms (2), (2') is hereinafter disclosed.

Before bridging the turbine rotor (A), the height of adjustable surface plates (4), (4') on the base frames (3), (3') adequately placed on the floor surface is adjusted with the adjusting bolts (14), (14') as in the case of existing support structure in order to obtain the horizontal levelling. When such vertical adjustment is once completed, suitable wedges (not shown in the figures) are driven into the clearances between the adjustable surface plates (4), (4') and the base frames (3), (3') in order to firmly and rigidly secure the adjustable surface plates to the base frames. Thereafter, both ends (12) of the shaft of the turbine rotor (A) are laid on the drive rollers (5), (5) and follower rollers (5'), (5') of the roller support bases (1), (1') respectively.

Figure 12:
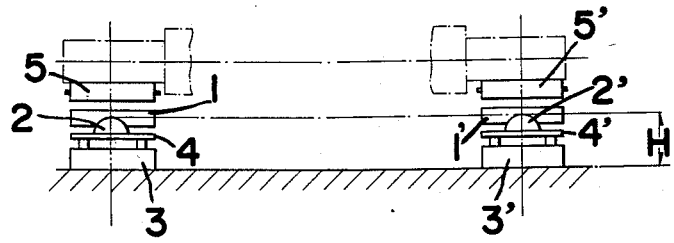
FIG. 12 and FIG. 13 are explanatory views showing the vertical levelling or alignment of the support structure before and after the disposition of the heavy rotatable object.
Figure 13:
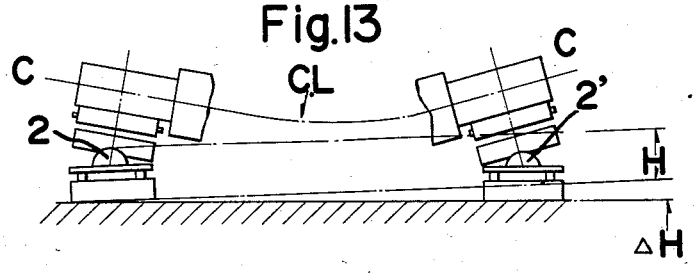
Figure 14:
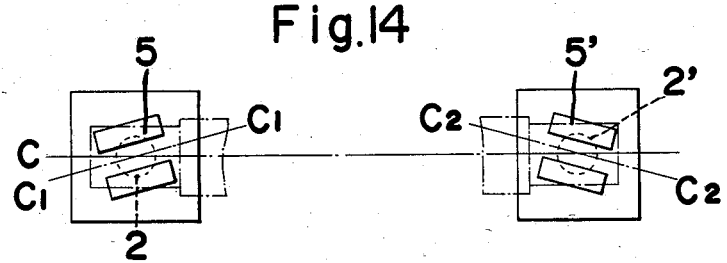
FIG. 14 and FIG. 15 show axis alignment in the horizontal direction of the support structure before and after the impellers are mounted.
Figure 15:
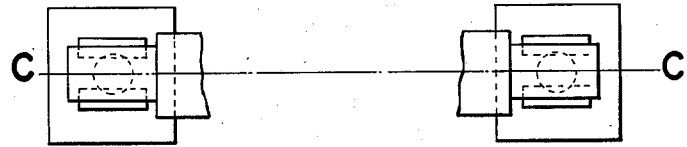

If the floor surface may distort or warp due to the weight of turbine rotor causing a poor levelling, such an error ΔH in the horizontal levelling is covered by the roller support bases (1), (1) which automatically follows a tilt by means of the hemi spherical support mechanisms (2), (2') so long as such error is not abnormally large, and the rollers (5), (5), (5'), (5') always support perpendicularly to the axis C—C of the shaft of the turbine rotor (A) even when the rotor shaft (12) may be distorted. (Refer to FIG. 12 and FIG. 13.) Namely, the axis of the turbine rotor (A) and rollers (5), (5), (5'), (5') are automatically aligned due to the weight of the turbine rotor (A). The same situation is in effect for the lateral direction. Namely, as shown in FIG. 14, even if the axes $C_1$—$C_1$ and $C_2$—$C_2$ of the rollers (5), (5) and (5'), (5') are not aligned slightly or mismatched to the axis C—C of the turbine rotor shaft connecting the crests of the hemi spherical support mechanisms (2), (2'), it can automatically be aligned to the axis C—C by the automatic axis adjusting function of the hemi spherical support mechanisms (2), (2'). (Refer to FIG. 15.)

Therefore, even when the drive rollers (5), (5) are driven so as to rotate the turbine rotor (A), it rotates on the same axis thereof and does not generate any movement thereof in the axial direction, not followed by frictional wearness of rollers (5), (5), (5'), (5') because both ends (12) of the shaft of the turbine rotor is uniformly supported by the rollers (5), (5), (5'), (5') by the surface contactness.

Furthermore, if the turbine rotor (A) moves even a little in the axial direction while it is rotating for checking and repairing the turbine rotor (A), the rotor support bases (1), (1') can be rotated horizontally around the shaft of the hemi spherical support mechanisms (2), (2') for the specified angle by moving forward or backward the adjusting bolts (31), (31') in accordance with the direction and calculated amount of movement of the turbine rotor (A) and thereby the movement of the turbine rotor (A) in the axial direction due to rotor drive can also be kept as small as possible.

As described above, the support structure according to the present invention can substantially and perfectly prevent movement of turbine rotor in the axial direction even during the rotation of the turbine rotor, does not require the readjustment which has been essentially required by the existing structure, can drastically reduce the time and labor necessary for the horizontal levelling operation, and also can outstandingly reduce frictional wearness of support rollers.

What we claim is:

1. A support device for a heavy rotatable object having a shaft adapted for checking and repairing the rotatable object, comprising:
   a base frame situated on a floor,
   a roller support base pivotally mounted on said base frame,
   a partially spherical support mechanism interposed between said base frame and said roller support base so that said roller support base can be tilted in any direction relative to the base frame around the partially spherical support mechanism,
   a pair of support rollers rotationally situated on said roller support base, said support rollers being spaced apart parallel to each other so that one end of the shaft of the rotatable object is rotationally retained and supported by said support rollers,
   a drive mechanism operationally connected to said support rollers, said drive mechanism, when the rotatable object is checked, being operated to actuate the support rollers to thereby rotate the rotatable object, and
   means for adjusting a lateral position of the roller support base relative to the base frame around the partially spherical support mechanism so that when the rotatable object is moved in an axial direction while rotating the support rollers for checking the rotatable object, the lateral position of the roller support base relative to the base frame is adjusted to thereby stop axial movement of the rotatable object, the axial movement of the rotatable object over the support rollers occurring when longitudinal axes of the support rollers and a longitudinal axis of the shaft of the rotatable object become non-parallel to each other at the time of effecting rotation of the rotatable object by the support rollers, even though the longitudinal axes of the support rollers and the longitudinal axis of the shaft of the rotatable object are substantially parallel to each other when the shaft of the rotatable object is placed on the support rollers under a non-rotatable condition.

2. A support device according to claim 1, in which said means for adjusting the lateral position comprises at least one jig situated between the roller support base and the base frame, said roller support base, when the jig is actuated, being moved relative to the base frame.

3. A support device according to claim 2, in which the center of the spherical support mechanism is located in a line perpendicular to a plane containing the longitudinal axes of said two support rollers, said line being disposed midway between the axes of said two support rollers and midway of a longitudinal length of said two support rollers so that when the shaft of the rotatable object is located on the support rollers, the weight of the rotatable object is substantially vertically applied to the partially spherical support mechanism to thereby allow the roller support base to be adjusted easily by means of the jig.

4. A support device according to claim 3, in which said roller support base is provided with a plurality of compression springs situated between the roller support base and the base frame to generally dispose the roller support base substantially horizontally relative to the base frame.

5. A support device according to claim 4, in which at least two jigs horizontally spaced apart from each other are provided between the roller support base and the base frame, each of said jigs including a bracket attached to the base frame and an adjusting bolt threadably engaging the bracket, said adjusting bolt, when operated, allowing the roller support base to move relative to the base frame.

6. A support device according to claim 5, in which said jig comprises a plate fixed to the base frame and having two vertical portions extending upwardly therefrom to form a gap between the vertical portions, two bolts threadably passing through the vertical portions respectively, and a projection attached to the roller support base to be situated in the gap, said projection being moved in the gap by adjusting the bolts to thereby adjust the relative position of the roller support base.

7. A support device for a heavy rotatable object having a shaft with two end portions adapted for checking and repairing the rotatable object, comprising:
a first support structure including a first base frame situated on a floor, a first roller support base pivotably mounted on said first base frame, a partially spherical first support mechanism interposed between the first base frame and the first roller support so that the first roller support base can be tilted in any direction relative to the first base frame around the partially spherical support mechanism, and a pair of first support rollers rotationally situated on said first roller support base, said first support rollers being spaced apart parallel to each other so that one end portion of the shaft of the rotatable object is rotationally held on and supported by the first support rollers, and
a second support structure including a second base frame situated on the floor, a second roller support base pivotally mounted on said base frame, a partially spherical second support mechanism interposed between the second base frame and the second roller support base so that the second roller support base can be tilted in any direction relative to the second base frame around the partially spherical support mechanism, a pair of second support rollers rotationally situated on said second roller support base, said second support rollers being spaced apart parallel to each other so that the other end portion of the shaft of the rotatable object is rotationally held on and supported by said second support rollers, a drive mechanism operationally connected to said second support rollers, said drive mechanism, when the rotatable object is checked, being operated to actuate the second support rollers to thereby rotate the rotatable object, and means for adjusting the lateral position of the roller support base relative to the base frame around the partially spherical support mechanism so that when the rotatable object is moved in an axial direction while rotating the support rollers for checking the rotatable object, a lateral position of the roller support base relative to the base frame is adjusted to thereby stop axial movement of the rotatable object, the axial movement of the rotatable object over the support rollers occurring when longitudinal axes of the support rollers and a longitudinal axis of the shaft of the rotatable object become non-parallel to each other at the time of effecting rotation of the rotatable object by the support rollers, even though the longitudinal axes of the support rollers and the longitudinal axis of the shaft of the rotatable object are substantially parallel to each other when the shaft of the rotatable object is placed on the support rollers under a non-rotatable condition.

8. A support device according to claim 7, in which said means for adjusting the lateral position comprises at least one jig situated between the second roller support base and the second base frame, said second roller support base, when the jig is actuated, being moved relative to the second base frame.

9. A support device according to claim 8, in which at least two jigs horizontally spaced apart from each other are provided between the second roller support base and the second base frame, each jig including a bracket attached to the second base frame and an adjusting bolt threadably engaging the bracket, said adjusting bolt, when operated, allowing the second roller support base to move relative to the second base frame.

10. A support device according to claim 8, in which said jig comprises a plate fixed to the second base frame and having two vertical portions extending upwardly therefrom to form a gap between the vertical portions, two bolts threadably passing through the vertical portions respectively, and a projection attached to the second roller support base to be situated in the gap, said projection being moved in the gap by adjusting the bolts to thereby adjust a relative position of the second roller support base.

11. A support device for a heavy rotatable object having a shaft adapted for checking and repairing the rotatable object, comprising:
a base frame situated on a floor,
a roller support base pivotally mounted on said base frame,
a partially spherical support mechaism interposed between said base frame and said roller support base so that said roller support base can be tilted in any direction relative to the base frame around the partially spherical support mechanism,
a pair of support rollers rotationally situated on said roller support base, said support rollers being spaced apart parallel to each other so that one end of the shaft of the rotatable object is rotationally retained and supported by said support rollers, a drive mechanism operationally connected to said support rollers, said drive mechanism, when the rotatable object is checked, being operated to actuate the support rollers to thereby rotate the rotatable object, and adjustment means operably disposed between said roller support base and said base frame for adjustably rotating said roller support base about said spherical support mechanism relative to said support base, said adjustment means adjustably rotating said roller support about a vertical axis such that longitudinal axes of said horizontal rollers are thereby adjustable in a horizontal plane, said adjustment means being operable to provide compensation for axial thrust of the rotatable object which results when the rotatable object is rotated between said pair of support rollers.

* * * * *